United States Patent
Baek et al.

(10) Patent No.: US 12,402,198 B2
(45) Date of Patent: Aug. 26, 2025

(54) METHOD AND DEVICE FOR PROVIDING POWER PREFERENCE INFORMATION IN WIRELESS COMMUNICATION SYSTEM

(71) Applicant: Samsung Electronics Co., Ltd., Suwon-si (KR)

(72) Inventors: Sangkyu Baek, Suwon-si (KR); Himke Van Der Velde, Staines upon Thames (GB); Soenghun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 435 days.

(21) Appl. No.: 17/771,708

(22) PCT Filed: Nov. 6, 2020

(86) PCT No.: PCT/KR2020/015495
§ 371 (c)(1),
(2) Date: Apr. 25, 2022

(87) PCT Pub. No.: WO2021/091296
PCT Pub. Date: May 14, 2021

(65) Prior Publication Data
US 2023/0007722 A1    Jan. 5, 2023

(30) Foreign Application Priority Data
Nov. 6, 2019  (KR) ................. 10-2019-0141248

(51) Int. Cl.
*H04W 76/27*   (2018.01)
*H04W 52/02*   (2009.01)
*H04W 76/38*   (2018.01)

(52) U.S. Cl.
CPC ....... *H04W 76/27* (2018.02); *H04W 52/0235* (2013.01); *H04W 76/38* (2018.02)

(58) Field of Classification Search
CPC .. H04W 76/27; H04W 76/38; H04W 52/0235
See application file for complete search history.

(56) References Cited

U.S. PATENT DOCUMENTS

| | | | |
|---|---|---|---|
| 2014/0036748 | A1 | 2/2014 | Mukherjee et al. |
| 2014/0044029 | A1 | 2/2014 | Chou et al. |

(Continued)

FOREIGN PATENT DOCUMENTS

| | | |
|---|---|---|
| CN | 109309969 A | 2/2019 |
| KR | 10-2010-0086040 A | 7/2010 |

(Continued)

OTHER PUBLICATIONS

Mediatek Inc., UE Indication for Transition out of RRC_Connected, R2-1908950, 3GPP TSG-RAN WG2 Meeting #107, Aug. 16, 2019, Prague, Czech Republic.

(Continued)

*Primary Examiner* — Wayne H Cai
(74) *Attorney, Agent, or Firm* — Jefferson IP Law, LLP

(57) ABSTRACT

Provided are a method and device for providing power preference information in a wireless communication system. A terminal according to an embodiment of the disclosure may identify the necessity for transition from a radio resource control (RRC) connected mode and transmit, to a base station, a connection release request message including state information preferred by the terminal. In this case, the state information preferred by the terminal may include information indicating whether a state preferred by the terminal is an idle mode, an inactive mode, a connected mode, or a random mode, and the random mode may indicate that the terminal prefers to be released from the connection mode but there is no preferred mode among the idle mode and the inactive mode.

12 Claims, 10 Drawing Sheets

(56) References Cited

U.S. PATENT DOCUMENTS

| | | | |
|---|---|---|---|
| 2019/0037425 A1 | 1/2019 | Hong et al. | |
| 2019/0082490 A1 | 3/2019 | Zhang et al. | |
| 2020/0178245 A1 | 6/2020 | Islam et al. | |
| 2020/0221490 A1 | 7/2020 | Baek et al. | |
| 2020/0413476 A1* | 12/2020 | He | H04W 52/028 |

FOREIGN PATENT DOCUMENTS

| | | |
|---|---|---|
| KR | 10-2014-0042338 A | 4/2014 |
| KR | 10-2020-0085138 A | 7/2020 |

OTHER PUBLICATIONS

Nokia et al., Transition out of RRC_Connected, R2-1910529, 3GPP TSG-RAN WG2 Meeting #107, Aug. 15, 2019, Prague, Czech Republic.

Huawei et al., Discussion on efficient RRC state transition, R2-1904965, 3GPP TSG-RAN WG2 Meeting #105bis, Mar. 29, 2019, Xian, China.

International Search Report dated Feb. 9, 2021, issued in International Application No. PCT/KR2020/015495.

CATT, Remaining issues on UE RRC state transition request, R2-1912110, 3GPP TSG-RAN WG2 Meeting #107bis, Oct. 3, 2019, Chongqing, P. R. China.

European Search Report dated Nov. 4, 2022, issued in European Application No. 20885770.6.

European Office Action dated Feb. 22, 2024, issued in European Application No. 20885770.6.

Chinese Office Action with English translation dated Jul. 30, 2024; Chinese Appln. No. 202080077350.1.

Chinese Office Action with English translation dated Dec. 31, 2024; Chinese Appln. No. 202080077350.1.

Chinese Office Action with English translation dated Apr. 27, 2025; Chinese Appln. No. 202080077350.1.

European Communication pursuant to Article 94(3) EPC dated Jul. 4, 2025; European Appln. No. 20 885 770.6-1206.

* cited by examiner

FIG. 2

```
UEAssistanceInformation-v16x0-IEs ::= SEQUENCE {
    powerSavingInfo-r16        PowerSavingInfo-r16    OPTIONAL,
    nonCriticalExtension       SEQUENCE {}            OPTIONAL
}

PowerSavingInfo-r16::= SEQUENCE {
    preferredMode    CHOICE {
        ENUMERATED { connected, idle, inactive, idleOrInactive },
        ...
    }
}
```

FIG. 3

```
UEAssistanceInformation-v16x0-IEs ::= SEQUENCE {
    releaseRequest-r16      ReleaseRequest-r16      OPTIONAL,
    powerSavingInfo-r16     PowerSavingInfo-r16     OPTIONAL,
    nonCriticalExtension    SEQUENCE {}             OPTIONAL
}

PowerSavingInfo-r16::=      CHOICE {
    releasePreference           ENUMERATED {connected, release},
    ...
}

PowerSavingInfo-r16::=      CHOICE {
    preferredMode               ENUMERATED {idle, inactive},
    ...
}
```

METHOD AND DEVICE FOR PROVIDING POWER PREFERENCE INFORMATION IN WIRELESS COMMUNICATION SYSTEM

TECHNICAL FIELD

The disclosure relates to a technology for managing power in a wireless communication system, and more particularly, to a method and device for providing power preference information in a wireless communication system.

BACKGROUND ART

To meet the increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post Long Term Evolution (post-LTE)' systems. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server or the like. To implement the IoT, various technological elements such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Accordingly, various attempts have been made to apply the 5G communication systems (or New Radio (NR)) to the IoT networks. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

DESCRIPTION OF EMBODIMENTS

Technical Problem

The disclosure provides a method and device for efficiently managing power in a wireless communication system when a terminal switches to a connected mode.

Solution to Problem

According to an embodiment, a method, performed by a terminal, for providing power preference information in a wireless communication system may include receiving, from a base station, configuration information about a connection release request, identifying a condition for transmission of a connection release request message, based on the received configuration information about the connection release request, and transmitting a connection release request message including whether there is a mode preferred by the terminal among an idle mode and an inactive mode or a preferred mode of the terminal, based on the identified condition.

BRIEF DESCRIPTION OF DRAWINGS

FIG. 2 is a diagram for describing a connection release request message according to an embodiment.

FIG. 3 is a diagram for describing a connection release request message according to another embodiment.

BEST MODE

Figure 1:
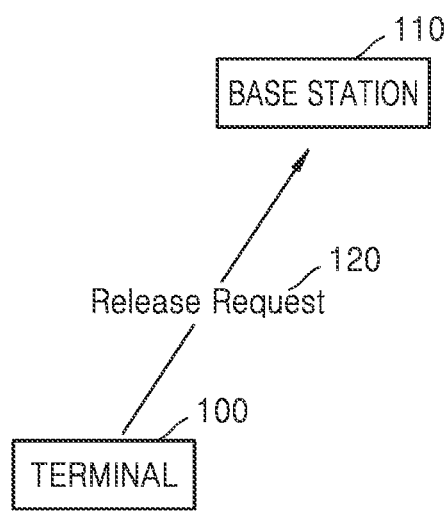
FIG. 1 is a diagram for describing an operation of transmitting, by a terminal, a connection release request message to a base station.

An embodiment of the disclosure may provide a terminal for transmitting state information in a wireless communication system. The terminal may include a transceiver and at least one processor, and the at least one processor may be configured to identify a necessity for transition from a radio resource control (RRC) connected mode, and transmit, to a base station, a connection release request message including state information preferred by the terminal. The state information preferred by the terminal may include information indicating whether a state preferred by the terminal is an idle mode, an inactive mode, a connected mode, or a random mode, and the random mode may indicate that the terminal prefers to be released from the connection mode but there is no preferred mode among the idle mode and the inactive mode.

According to an embodiment, in case that the state information preferred by the terminal includes information indicating that the state preferred by the terminal is the connected mode, the state information preferred by the terminal may be transmitted in case that the terminal prefers to revert an earlier indication indicating that the terminal prefers to transition from the RRC connected mode.

According to an embodiment, the at least one processor may be configured to start a connection release request prohibition timer and initiate transmission of the connection release request message including the state information preferred by the terminal, and the connection release request message including the state information preferred by the terminal may be transmitted in case that the connection release request prohibition timer is not running.

According to an embodiment, the connection release request prohibition timer may be stopped in case that RRC connection reestablishment is initiated or RRC connection resumption is initiated.

According to an embodiment, the necessity for transition from the RRC connected mode may be identified to reduce power consumption of the terminal.

According to an embodiment, the at least one processor may be configured to receive, from the base station, configuration information associated with the connection release request message, and the configuration information associated with the connection release request message may include configuration information indicating whether the state information preferred by the terminal can be reported and configuration information associated with a connection release request prohibition timer.

According to an embodiment, the configuration information indicating whether the state information preferred by the terminal can be reported may include an indicator indicating whether the state information preferred by the terminal can be reported in case that the terminal is in the connected state.

Another embodiment of the disclosure may provide a base station for receiving state information in a wireless communication system. The base station may include a transceiver and at least one processor, and the at least one processor may be configured to receive, from a terminal, a connection release request message including state information preferred by the terminal, and transmit, to the terminal, configuration information associated with state information based on the received connection release request message. The state information preferred by the terminal may include information indicating whether a state preferred by the terminal is an idle mode, an inactive mode, a connected mode, or a random mode, and the random mode may indicate that the terminal prefers to be released from the connection mode but there is no preferred mode among the idle mode and the inactive mode.

According to an embodiment, when the state information preferred by the terminal includes information indicating that the state preferred by the terminal is the connected mode, the state information preferred by the terminal may be transmitted in case that the terminal prefers to revert an earlier indication indicating that the terminal prefers to transition from a radio resource control (RRC) connected mode.

According to an embodiment, the at least one processor may be configured to transmit, to the terminal, configuration information associated with the connection release request message, and the configuration information associated with the connection release request message may include configuration information indicating whether the state information preferred by the terminal can be reported and configuration information associated with a connection release request prohibition timer.

According to an embodiment, the connection release request message including the state information preferred by the terminal may be received in case that the connection release request prohibition timer is not running.

According to an embodiment, the connection release request prohibition timer may be stopped in case that RRC connection reestablishment is initiated or RRC connection resumption is initiated.

According to an embodiment, the configuration information indicating whether the state information preferred by the terminal can be reported may include an indicator indicating whether the state information preferred by the terminal can be reported in case that the terminal is in the connected state.

Another embodiment of the disclosure provides a method of operating a terminal for transmitting state information in a wireless communication system. The method may include: identifying a necessity for transition from a radio resource control (RRC) connected mode; and transmitting, to a base station, a connection release request message including state information preferred by the terminal, wherein the state information preferred by the terminal may include information indicating whether a state preferred by the terminal is an idle mode, an inactive mode, a connected mode, or a random mode, and the random mode may indicate that the terminal prefers to be released from the connection mode but there is no preferred mode among the idle mode and the inactive mode.

Another embodiment of the disclosure provides a method of operating a base station for receiving state information in a wireless communication system. The method may include: receiving, from a terminal, a connection release request message including state information preferred by the terminal; and transmitting, to the terminal, configuration information associated with state information based on the received connection release request message, wherein the state information preferred by the terminal may include information indicating whether a state preferred by the terminal is an idle mode, an inactive mode, a connected mode, or a random mode, and the random mode may indicate that the terminal prefers to be released from the connection mode but there is no preferred mode among the idle mode and the inactive mode.

MODE OF DISCLOSURE

In the following description of the disclosure, detailed descriptions of well-known functions or configurations will be omitted because they would unnecessarily obscure the subject matters of the disclosure. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are used for convenience of description. Thus, the disclosure is not limited to the terms described below and other terms referring to objects having equivalent technical meanings may be used.

In the following description, terms and names defined in the $3^{rd}$ Generation Partnership Project Long Term Evolution (3GPP LTE) standards may be used for convenience of description. However, the disclosure is not limited to such terms and names and may be similarly applied to systems according to other standards.

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The uplink may refer to a radio link for transmitting data or a control signal from a terminal (e.g., a user equipment (UE) or a mobile station (MS)) to a base station (e.g., an eNode B (eNB) or a base station (BS)), and the downlink may refer to a radio link for transmitting data or a control signal from the base station to the terminal. The above-described multiple access schemes distinguish between data or control information of different users by allocating time-frequency resources for the data or control information of the users not to overlap each other, that is, to achieve orthogonality therebetween.

As post-LTE systems, 5G systems may have to support services capable of simultaneously satisfying various requirements because they may have to freely reflect various requirements of users, service providers, and the like. Services considered for the 5G systems may include enhanced mobile broadband (eMBB), massive machine-type communication (mMTC), and ultra-reliability low-latency communication (URLLC) services.

According to some embodiments, the eMBB may aim to provide an improved data rate than the data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of a base station. Also, the 5G communication system may have to provide an increased user-perceived data rate of a terminal while providing a peak data rate. In order to satisfy this requirement, the 5G communication system may require the improvement of various transmission/reception technologies including a more improved Multi Input Multi Output (MIMO) transmission technology. Also, the 5G communication system may satisfy a required data rate by using a frequency bandwidth wider than 20 MHz in the 3 GHz to 6 GHz or 6 GHz or more frequency band while transmitting signals by using a transmission bandwidth of up to 20 MHz in the 2 GHz band used in the current LTE.

Simultaneously, the mMTC is being considered to support application services such as Internet of Thing (IoT) in 5G communication systems. In order to efficiently provide the IoT, the mMTC may require the support for access of large terminals in a cell, improved terminal coverage, improved battery time, reduced terminal cost, and the like. Because the IoT is attached to various sensors and various devices to provide a communication function, it should be able to support a large number of terminals (e.g., 1,000,000 terminals/km$^2$) in a cell. Also, because a terminal supporting the mMTC is likely to be located in a shadow area failing to be covered by the cell, such as the basement of a building, due to the characteristics of the service, it may require wider coverage than other services provided by the 5G communication systems. The terminal supporting the mMTC should be configured as a low-cost terminal and may require a very long battery life time of about 10 years to about 15 years because it is difficult to frequently replace the battery of the terminal.

Lastly, the URLLC may be used in services for remote control of robots or machinery, industrial automation, unmanned aerial vehicles, remote health care, emergency alerts, and the like, as cellular-based wireless communication services used for mission-critical purposes. Thus, the communication provided by the URLLC may have to provide very low latency (ultra-low latency) and very high reliability (ultra-high reliability). For example, a service supporting the URLLC should satisfy an air interface latency of less than 0.5 milliseconds and simultaneously may have a requirement for a packet error rate of $10^{-5}$ or less. Thus, for the service supporting the URLLC, the 5G system should provide a smaller transmit time interval (TTI) than other services and simultaneously may have a design requirement for allocating wide resources in frequency bands in order to secure the reliability of communication links.

The above three services of eMBB, URLLC, and mMTC considered in the 5G communication systems may be multiplexed and transmitted in one system. In this case, different transmission/reception techniques and transmission/reception parameters may be used between services in order to satisfy different requirements of the respective services. However, the above-described mMTC, URLLC, and eMBB are merely examples of different service types, and the service types to which the disclosure is applied are not limited thereto.

Also, although embodiments of the disclosure will be described below by using an LTE, LTE-A, LTE Pro, or 5G (or NR, next-generation mobile communication) as an example, the embodiments of the disclosure may also be applied to other communication systems having similar technical backgrounds or channel types. Also, the embodiments of the disclosure may also be applied to other communication systems through some modifications without departing from the scope of the disclosure by the judgment of those of ordinary skill in the art.

FIG. 1 is a diagram for describing an operation of transmitting, by a terminal, a connection release request message to a base station.

In a connected mode (RRC_CONNECTED), a terminal 100 may establish a connection with a base station 110 to perform a data transmission/reception operation with the base station 110. Also, the terminal 100 in the connected mode should monitor a physical downlink control channel (PDCCH) including resource allocation by the base station 110 and perform signal measurement for data communication. Because this operation causes power consumption of the terminal 100, it may be inefficient for the terminal 100 to stay in the connected mode in a situation where data is not generated. If the terminal 100 determines to release the connected mode to reduce power consumption, the terminal 100 may transmit a connection release request message 120 to the base station 110. For example, the base station may transmit a connection release request message to the terminal in case that the terminal transmitting/receiving data in the connected mode does not transmit/receive data for a certain reason or for a certain time.

The connection release request message may include at least one of information about whether the terminal 100 prefers a connection release, information about which RRC mode the terminal 100 prefers to switch, or information about whether the terminal 100 reverts a connection release.

The connection release request message may be triggered in case that the terminal 100 in the connected mode (RRC_CONNECTED) prefers to switch to an idle mode (RRC_IDLE) or an inactive mode (RRC_INACTIVE) which is not the connected mode. However, this is merely an embodiment, and in another embodiment, the meaning of the statement that the terminal 100 prefers to switch to the idle mode or the inactive mode which is not the connected mode may include the meaning of the statement that data transmission/reception is not expected for a short time. When the base station 110 receives the connection release request message, the base station 110 may identify that the terminal 100 prefers a connection release for the purpose of power consumption or the like. Also, through the connection release request message, the base station 100 may identify a mode (e.g., the idle mode or the inactive mode) preferred by the terminal 100 and may indicate switch to the corresponding mode. When the terminal 100 reverts the connection release request message, the terminal 100 may continue to operate in the connected mode.

FIG. 2 is a diagram for describing a connection release request message according to an embodiment.

Referring to FIG. 2, the connection release request message may include information indicating that the terminal prefers to switch to the idle mode or the inactive mode. Also, the terminal may indicate to which mode the terminal prefers to particularly switch through the connection release request message. When the terminal prefers to switch to the idle mode, the terminal may provide information indicating that its own preferred power mode is the idle mode (RRC_IDLE), to the base station through the connection release request message. When the terminal prefers to switch to the inactive mode, the terminal may provide information indicating that its own preferred power mode is the inactive mode (RRC_INACTIVE), to the base station through the connection release request message. However, this is merely an example, and according to another example, when the terminal prefers to switch to the idle mode or the inactive mode that is not the connected mode but there is no preferred mode among the two, the terminal may provide information indicating that its own preferred power mode is the idle mode or the inactive mode, to the base station through the connection release request message. Also, in case that the terminal does not undergo a power problem or in case that there is a possibility of recovery and thus the terminal prefers to stay in the connected mode, the terminal may provide information indicating that its own preferred power mode is the connected mode (RRC_CONNECTED), to the base station through the connection release request message.

Referring to FIG. 2, the connection release request message may be included in a UE (user equipment) Assistance Information message and transmitted. Various pieces of terminal information may be transmitted to the base station through the UE Assistance Information message, and the connection release request message may be one of the various pieces of terminal information.

Moreover, in the embodiment of FIG. 2, it is described that the connection release request message is transmitted in a powerSavingInfo-r16 field; however, this is merely an example, and the name of the field including the connection release request message is not limited thereto. If the powerSavingInfo-r16 field is transmitted, this may mean that the connection release request message is transmitted. The powerSavingInfo-r16 field may include a preferred mode (preferredMode) field, and the preferred mode field may have one of the following four values.

Connected: the terminal prefers to keep in the connected mode. This value may be used in case that the terminal requests to switch to another mode that is not the connected mode and then reverts the request.

Idle: the terminal prefers a connection release, and its preferred mode is the idle mode.

Inactive: the terminal prefers a connection release, and its preferred mode is the inactive mode.

idleOrinactive: the terminal prefers a connection release, and there is no preferred mode among the idle mode and the inactive mode.

However, this is merely an embodiment, and according to another embodiment, in case that the UE Assistance Information message includes a preferred mode field having one of the four values described above, transmission of the UE Assistance Information message may mean transmission of the connection release request message. If the connection release request message is transmitted in a state where the terminal is not in the connected mode, the Connected value in this case may mean that the terminal prefers to switch to the connected mode.

FIG. 3 is a diagram for describing a connection release request message according to another embodiment.

Referring to FIG. 3, the connection release request message may include information indicating that the terminal prefers to switch to the idle mode or the inactive mode. Also, the terminal may indicate to which mode the terminal prefers to particularly switch through the connection release request message. When the terminal prefers to switch to the idle mode, the terminal may provide information indicating that its own preferred power mode is the idle mode (RRC_IDLE), to the base station through the connection release request message. When the terminal prefers to switch to the inactive mode, the terminal may provide information indicating that its own preferred power mode is the inactive mode (RRC_INACTIVE), to the base station through the connection release request message. However, this is merely an example, and according to another example, when the terminal prefers to switch to the idle mode or the inactive mode that is not the connected mode but there is no preferred mode among the two, the terminal may provide information indicating that its own preferred power mode is not among the idle mode or the inactive mode, to the base station through the connection release request message. Also, when the terminal does not undergo a power problem or when there is a possibility of recovery and thus the terminal prefers to stay in the connected mode, the terminal may provide information indicating that its own preferred power mode is the connected mode (RRC_CONNECTED), to the base station through the connection release request message.

Referring to FIG. 3, the connection release request message may be transmitted through a UE Assistance Information message. Various pieces of terminal information may be transmitted to the base station through the UE Assistance Information message, and the connection release request message may be one of the various pieces of terminal information. Moreover, in the embodiment of FIG. 3, it is described that the connection release request message is transmitted in a releaseRequest-r16 field and a powerSavingInfo-r16 field; however, this is merely an example, and the name of the field including the connection release request message is not limited thereto. If the releaseRequest-r16 field is transmitted, this may mean that the connection release request message is transmitted. The releaseRequest-r16 field may include whether the terminal prefers a connection release or whether the terminal prefers to keep in the connected mode (RRC_CONNECTED), which may be determined by information of a releasePreference field. In this case, the releasePreference field may have one of the following two values.

Connected: the terminal prefers to keep in the connected mode. This value may be used when the terminal requests to switch to another mode that is not the connected mode and then cancels the request.

Release: the terminal prefers a connection release.

However, this is merely an embodiment, and according to another embodiment, in case that a releaseRequest-r16 value is configured as True, the base station may interpret that the terminal prefers a connection release. If the connection release request message is transmitted in a state where the terminal is not in the connected mode, the Connected value in this case may mean that the terminal prefers to switch to the connected mode.

Also, the powerSavingInfo-r16 field may include a mode preferred when the terminal prefers a connection release. The preferred mode may be included as a preferred mode (preferredMode) field in the powerSavingInfo-r16 field, and the preferred mode field may have one of the following two values.

Idle: the terminal prefers a connection release, and the preferred mode is the idle mode.

Inactive: the terminal prefers a connection release, and the preferred mode is the inactive mode.

In this case, not including the preferredMode field may mean that the terminal does not have a preferred mode among the idle mode and the inactive mode.

Figure 4:
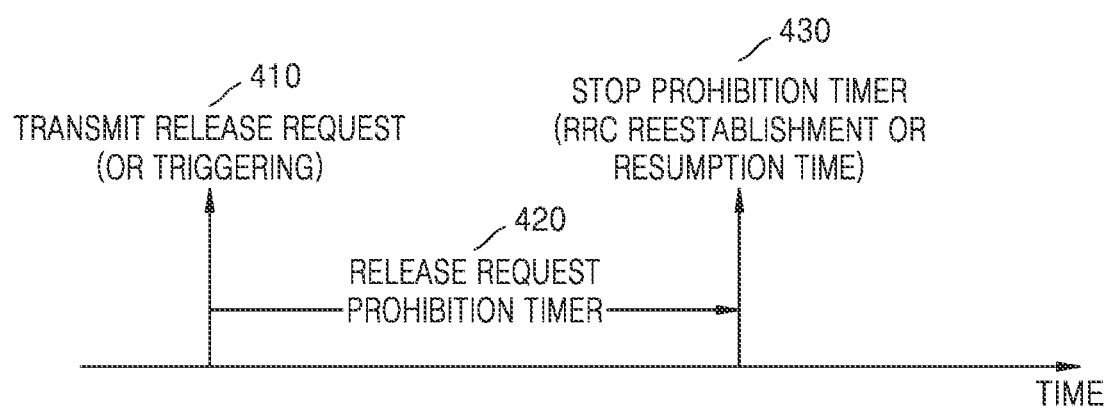
FIG. 4 is a diagram for describing a method of operating a prohibition timer of a connection release request message according to an embodiment.

FIG. 4 is a diagram for describing a method of operating a prohibition timer of a connection release request message according to an embodiment. In case that transmission of the connection release request message by the terminal (410) is performed too frequently, radio resources can be wasted. Thus, the terminal may perform configuration of 'a connection release request message prohibition timer' for prohibiting transmission of the connection release request message (420). The connection release request message prohibition timer may be started at one of the times in case that the connection release request message is triggered, initiated, or transmitted. According to an embodiment, the terminal may not transmit the connection release request message when the connection release request message prohibition timer runs. However, this is merely an embodiment, and according to another embodiment, a message for canceling the connection release request message transmitted by the terminal or a message indicating that the terminal prefers to keep in the connected mode may be transmitted regardless of whether the connection release request message prohibition timer runs. Moreover, the connection release request message, which is triggered when the connection release request message prohibition timer expires, may be transmitted.

The connection release request message prohibition timer which is running may be stopped when RRC connection reestablishment is initiated (430). When RRC connection reestablishment is performed, applied connection release request message-related configuration may be released. This may be because when RRC connection reestablishment is performed, the connection release message prohibition timer which is running and the connection release request message-related configuration are no longer valid. Also, the connection release request message prohibition timer which is running may be stopped when RRC connection resumption is initiated. When RRC connection resumption is performed, applied connection release request message-related configuration may be released. This may be because the connection release message prohibition timer which is running and the connection release request message-related configuration are no longer valid. The timer value of the connection release message prohibition timer may be configured and included in a RRC configuration message of the base station.

Figure 5:
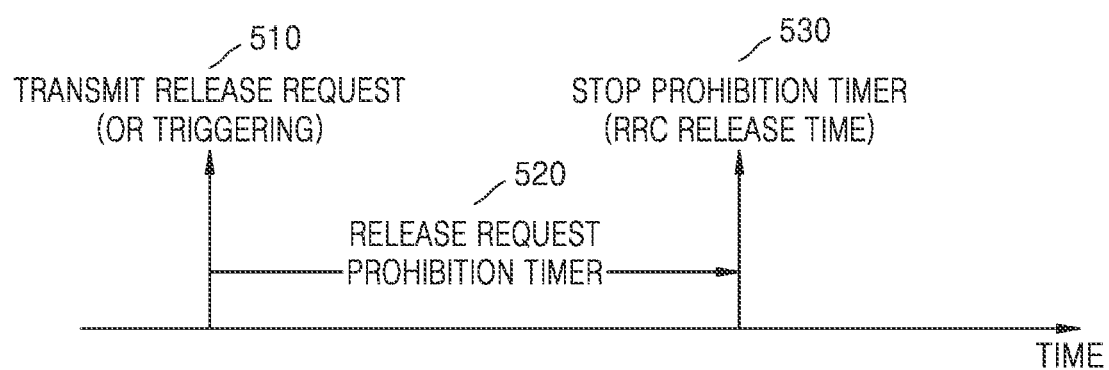
FIG. 5 is a diagram for describing a method of operating a prohibition timer of a connection release request message according to another embodiment.

FIG. 5 is a diagram for describing a method of operating a prohibition timer of a connection release request message according to another embodiment.

In case that transmission of the connection release request message by the terminal (510) is performed too frequently, radio resources can be wasted. Thus, the terminal may perform configuration of 'a connection release request message prohibition timer' for prohibiting transmission of the connection release request message (520). The connection release request message prohibition timer may be started at one of the times when the connection release request message is triggered, initiated, or transmitted. According to an embodiment, the terminal may not transmit the connection release request message when the connection release request message prohibition timer runs. However, this is merely an embodiment, and according to another embodiment, a message for canceling the connection release request message transmitted earlier by the terminal or a message indicating that the terminal prefers to keep in the connected mode may be transmitted regardless of whether the connection release request message prohibition timer runs. Moreover, the connection release request message triggered when the connection release request message prohibition timer expires may be transmitted.

The connection release request message prohibition timer in operation may be stopped when RRC connection release is performed (530). When RRC connection is released, applied connection release request message-related configuration may be released. This may be because when RRC connection release is performed, the connection release message prohibition timer in operation and the connection release request message-related configuration are no longer valid. The timer value of the connection release message prohibition timer may be configured and included in a RRC configuration message of the base station.

Figure 6:
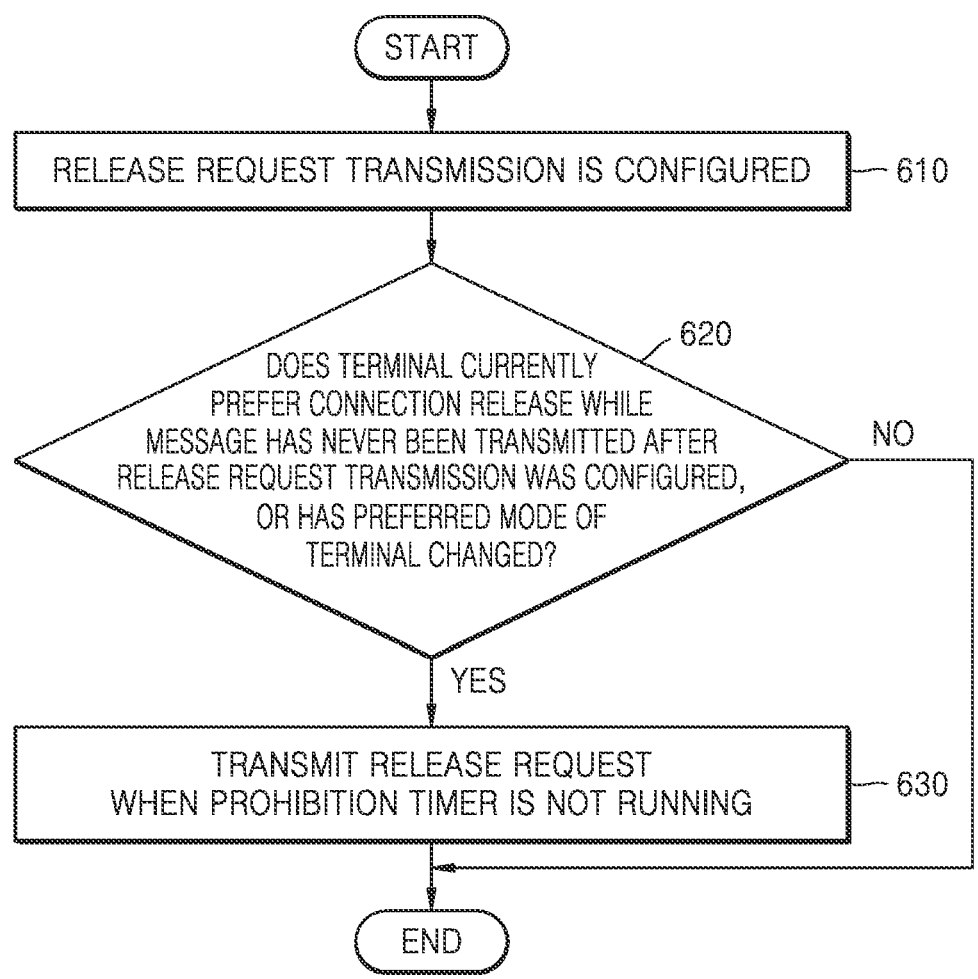
FIG. 6 is a diagram for describing an operation of transmitting a connection release request message according to an embodiment.

FIG. 6 is a diagram for describing an operation of transmitting a connection release request message according to an embodiment. In case that transmission of the connection release request message is configured in the terminal (610), the terminal may transmit the connection release request message to the base station when a preconfigured condition is satisfied. The configuration of the connection release request message may include at least one of information about whether the base station permits transmitting the connection release request message to the terminal, the timer value of the connection release message prohibition timer, or information about whether the prohibition timer is to be applied to a connection release cancellation (prefers to stay in connected mode) message. The terminal may determine 1) whether the terminal currently wants a connection release while the message has never been transmitted after transmission of the connection release request message was configured or 2) whether the preferred mode of the terminal has changed (620). When at least one of these two conditions is satisfied in operation 620, the terminal may transmit the connection release request message to the base station when the connection release message prohibition timer is not running (630). The format of the message described in FIG. 2 or FIG. 3 may be applied to the connection release request message transmitted to the base station. The connection release request message may include information about whether the terminal prefers to keep in the connected mode, whether the terminal prefers a connection release and wants to switch to the idle mode, whether the terminal prefers a connection release and prefers to switch to the inactive mode, or whether the terminal prefers a connection release but there is a preference among the idle mode and the inactive mode. However, this is merely an embodiment, and according to another embodiment, the connection release request message may include information about whether the terminal prefers to keep in the connected mode or prefers a connection release and whether the terminal prefers the idle mode or prefers the inactive mode or there is no preferred mode among the idle mode and the inactive mode when the terminal prefers a connection release.

Figure 7:
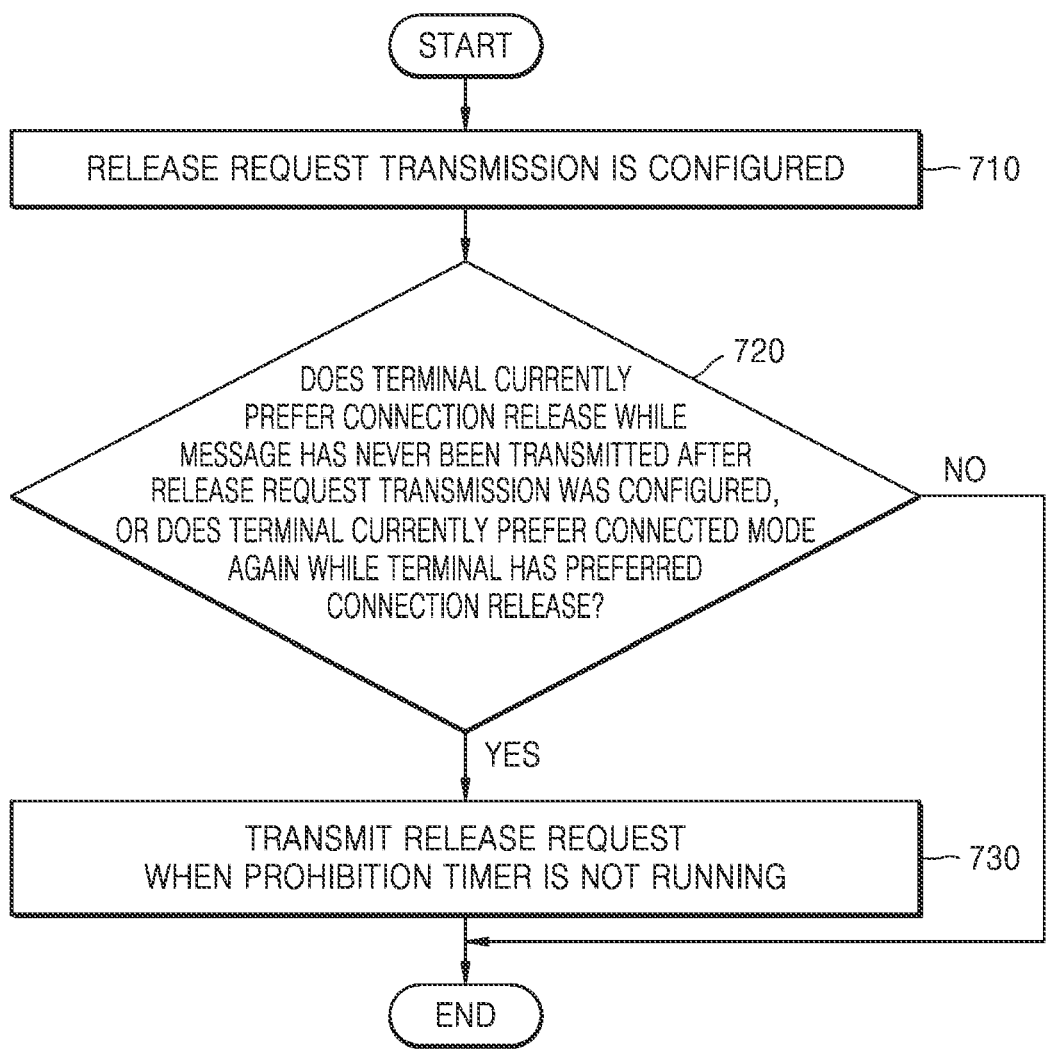
FIG. 7 is a diagram for describing an operation of transmitting a connection release request message according to another embodiment.

FIG. 7 is a diagram for describing an operation of transmitting a connection release request message according to another embodiment. When transmission of the connection release request message is configured in the terminal (710), the terminal may transmit the connection release request message to the base station when a preconfigured condition is satisfied. The configuration of the connection release request message may include at least one of information about whether the base station permits transmitting the connection release request message to the terminal, the timer value of the connection release message prohibition timer, or information about whether the prohibition timer is to be applied to a connection release cancellation (wants to stay in connected mode) message. The terminal may determine 1) whether the terminal currently prefers a connection release while the message has never been transmitted after transmission of the connection release request message was configured or 2) whether the terminal currently prefers to stay in the connected mode again while the terminal has preferred a connection release immediately previously and thus preferring an RRC release (preferring to switch to the idle mode, the inactive mode, or a mode that is not the connected mode) has been indicated and transmitted in the connection release request message (720). This situation may be a case where the terminal prefers to be in the connected mode due to immediate power supply or the like. When at least one of these two conditions is satisfied in operation 720, the terminal may transmit the connection release request message to the base station when the connection release message prohibition timer is not running (730). The format of the message described in FIG. 2 or FIG. 3 may be applied to the connection release request message transmitted to the base station. The connection release request message may include information about whether the terminal wants to keep in the connected mode, whether the terminal wants a connection release and wants to switch to the idle mode, whether the terminal wants a connection release and wants to switch to the inactive mode, and whether the terminal wants a connection release but there is a preference among the idle mode and the inactive mode. However, this is merely an embodiment, and according to another embodiment, the connection release request message may include information about whether the terminal wants to keep in the connected mode or wants a connection release and whether the terminal wants the idle mode or wants the inactive mode or there is no preferred mode among the idle mode and the inactive mode when the terminal wants a connection release.

Figure 8:
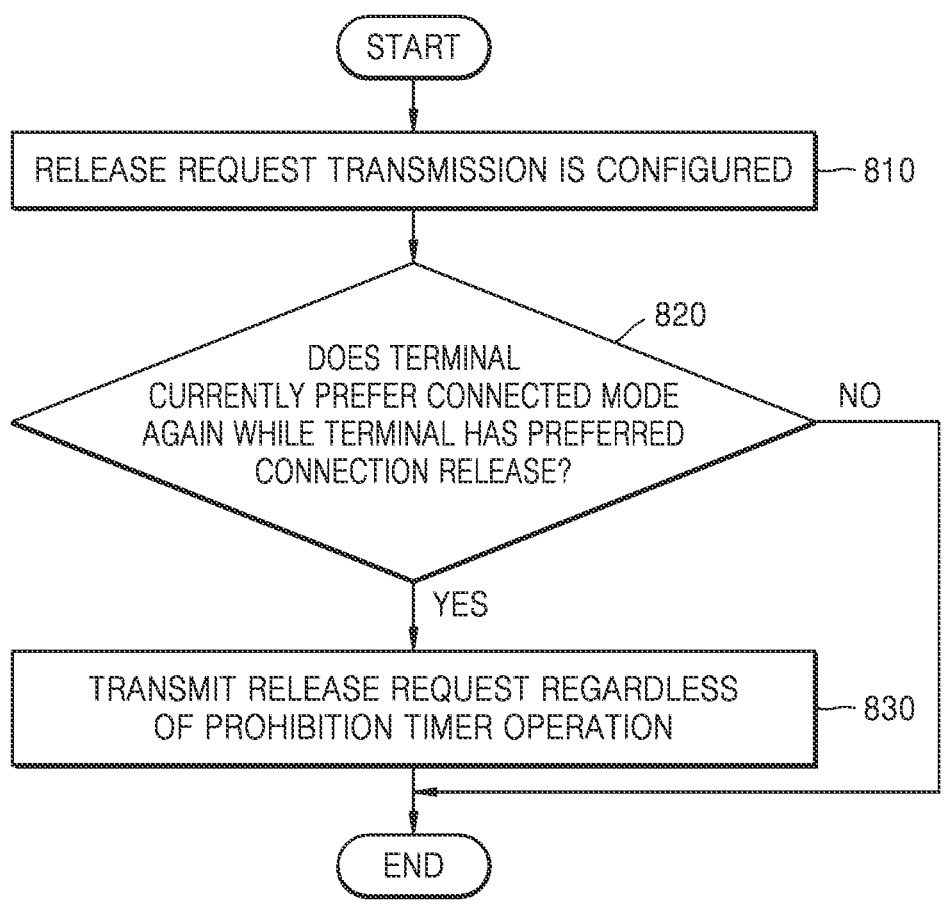
FIG. 8 is a diagram for describing an operation of transmitting a connection release request message according to another embodiment.

FIG. 8 is a diagram for describing an operation of transmitting a connection release request message according to another embodiment. When transmission of the connection release request message is configured in the terminal (810), the terminal may transmit the connection release request message to the base station in case that a preconfigured condition is satisfied. The configuration of the connection release request message may include at least one of information about whether the base station permits transmitting the connection release request message to the terminal, the timer value of the connection release message prohibition timer, or information about whether the prohibition timer is to be applied to a connection release cancellation (wants to stay in connected mode) message. The terminal may determine whether the terminal currently prefers to stay in the connected mode again while the terminal has preferred a connection release immediately previously and thus preferring an RRC release (preferring to switch to the idle mode, the inactive mode, or a mode that is not the connected mode) has been indicated and transmitted in the connection release request message (820). This may be applied when the terminal wants to be in the connected mode due to immediate power supply or the like. When the condition of operation 820 is satisfied, the terminal may transmit the connection release request message to the base station regardless of the operation of the connection release message prohibition timer (830). This may be to allow the terminal to stay in the connected mode when there is no more problem in the power supplied to the terminal, because the terminal staying in the connected mode is efficient for data transmission/reception. The format of the message described with reference to FIG. 2 or FIG. 3 may be applied to the connection release request message transmitted to the base station. The connection release request message may include information indicating that the terminal prefers to keep in the connected mode. Moreover, this is merely an embodiment, and according to another embodiment, the connection release request message may include information indicating that the preferred mode of the terminal is the connected mode.

Figure 9:
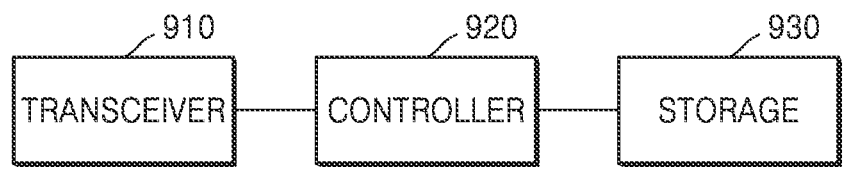
FIG. 9 is a diagram illustrating a structure of a base station according to an embodiment.

FIG. 9 is a diagram illustrating a structure of a base station according to an embodiment.

Referring to FIG. 9, the base station may include a transceiver 910, a controller 920, and a storage 930. In the disclosure, the controller 920 may be defined as a circuit, an application-specific integrated circuit, or at least one processor.

The transceiver 910 may exchange signals with other network entities. For example, the transceiver 910 may transmit system information to the terminal and may transmit a synchronization signal or a reference signal thereto.

The controller 920 may control an overall operation of the base station according to an embodiment of the disclosure. For example, the controller 920 may control a signal flow between the respective blocks to perform an operation according to the flowchart described above.

The storage 930 may store at least one of information transmitted/received through the transceiver 910 and information generated through the controller 920.

Figure 10:
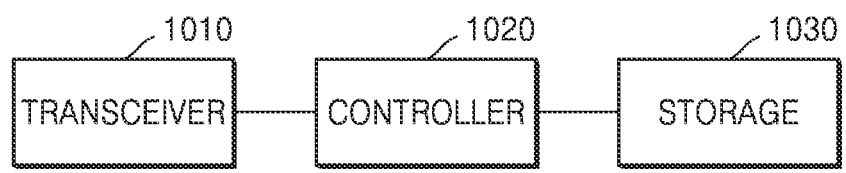
FIG. 10 is a diagram illustrating a structure of a terminal according to an embodiment.

FIG. 10 is a diagram illustrating a structure of a terminal according to an embodiment.

Referring to FIG. 10, the terminal may include a transceiver 1010, a controller 1020, and a storage 1030. In the disclosure, the controller 1020 may be defined as a circuit, an application-specific integrated circuit, or at least one processor.

The transceiver 1010 may exchange signals with other network entities. For example, the transceiver 1010 may receive system information from the base station and may receive a synchronization signal or a reference signal therefrom.

The controller 1020 may control an overall operation of the terminal according to an embodiment of the disclosure. For example, the controller 1020 may control a signal flow between the respective blocks to perform an operation according to the flowchart described above.

The storage 1030 may store at least one of information transmitted/received through the transceiver 1010 and information generated through the controller 1020.

The methods according to the embodiments of the disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored a memory including any combination of some or all thereof. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network including any combination thereof. Such a storage device may be connected through an external port to an apparatus performing an embodiment of the disclosure. Also, a separate storage device on a communication network may be connected to an apparatus performing an embodiment of the disclosure.

In the above particular embodiments of the disclosure, the components included in the disclosure are expressed in the singular or plural according to the particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

While particular embodiments of the disclosure have been described above, it will be understood that various modifications may be made therein without departing from the scope of the disclosure. Therefore, the scope of the disclosure should not be limited to the described embodiments of the disclosure and should be defined by the following claims and equivalents thereof.

The invention claimed is:

1. A terminal in radio resource control (RRC) connected mode in a wireless communication system, the terminal comprising:
a transceiver; and
at least one processor coupled with the transceiver and configured to:
determine a preferred mode field which has a first value indicating one of an Idle, an Inactive, a Connected or an idleOrInactive, and
transmit, to a base station, a message including the preferred mode field,
wherein the Idle indicates that the terminal prefers an RRC idle mode from the RRC connected mode,
wherein the Inactive indicates that the terminal prefers an RRC inactive mode from the RRC connected mode,
wherein the idleOrInactive indicates that the terminal prefers to be released from the RRC connected mode and indicates that the terminal has no preference between the RRC idle mode and the RRC inactive mode, and
wherein the Connected indicates that the terminal indicates a second value indicating one of the Idle, the Inactive or the idleOrInactive and then prefers to revert the indication of the second value.

2. The terminal of claim 1,
wherein the at least one processor is configured to start a prohibition timer for reporting the preferred mode field, in case that the prohibition timer is not running.

3. The terminal of claim 2, wherein the prohibition timer is stopped in case that RRC connection reestablishment is initiated or RRC connection resumption is initiated.

4. The terminal of claim 1, wherein a necessity for transition from the RRC connected mode is identified to reduce power consumption of the terminal.

5. The terminal of claim 1,
wherein the at least one processor is configured to receive, from the base station, configuration information for indicating a preferred mode of the terminal, and
wherein the configuration information includes information associated with a prohibition timer for reporting the preferred mode field.

6. The terminal of claim 5, wherein the configuration information further includes an indicator indicating that the preferred mode field can be reported in case that the terminal prefers to stay in the RRC connected mode.

7. A base station in a wireless communication system, the base station comprising:
a transceiver; and
at least one processor coupled with the transceiver and configured to:
receive, from a terminal, a message including a preferred mode field, and
identify the preferred mode field which has a first value indicating one of an Idle, an Inactive, a Connected or an idleOrInactive,
wherein the Idle indicates that the terminal prefers a radio resource control (RRC) idle mode from an RRC connected mode,
wherein the Inactive indicates that the terminal prefers an RRC inactive mode from the RRC connected mode,
wherein the idleOrInactive indicates that the terminal prefers to be released from the RRC connected mode and indicates that the terminal has no preference between the RRC idle mode and the RRC inactive mode, and
wherein the Connected indicates that the terminal indicates a second value indicating one of the Idle, the Inactive or the idleOrInactive and then prefers to revert the indication of the second value.

8. The base station of claim 7,
wherein the at least one processor is configured to transmit, to the terminal, configuration information for indicating a preferred mode of the terminal, and wherein the configuration information includes information associated with a prohibition timer for reporting the preferred mode field.

9. The base station of claim 8, wherein the prohibition timer is stopped in case that RRC connection reestablishment is initiated or RRC connection resumption is initiated.

10. The base station of claim 8, wherein the configuration information further includes an indicator indicating that the preferred mode field can be reported in case that the terminal prefers to stay in the RRC connected mode.

11. A method of operating a terminal in radio resource control (RRC) connected mode in a wireless communication system, the method comprising:
  determining a preferred mode field which has a first value indicating one of an Idle, an Inactive, a Connected or an idleOrInactive; and
  transmitting, to a base station, a message including the preferred mode field,
  wherein the Idle indicates that the terminal prefers an RRC idle mode from the RRC connected mode,
  wherein the Inactive indicates that the terminal prefers an RRC inactive mode from the RRC connected mode,
  wherein the idleOrInactive indicates that the terminal prefers to be released from the RRC connected mode and indicates that the terminal has no preference between the RRC idle mode and the RRC inactive mode, and
  wherein the Connected indicates that the terminal indicates a second value indicating one of the Idle, the Inactive or the idleOrInactive, and then prefers to revert the indication of the second value.

12. A method of operating a base station in a wireless communication system, the method comprising:
  receiving, from a terminal, a message including a preferred mode field; and
  identifying the preferred mode field which has a first value indicating one of an Idle, an Inactive, a Connected or an idleOrInactive,
  wherein the Idle indicates that the terminal prefers a radio resource control (RRC) idle mode from an RRC connected mode,
  wherein the Inactive indicates that the terminal prefers an RRC inactive mode from the RRC connected mode,
  wherein the idleOrInactive indicates that the terminal prefers to be released from the RRC connected mode and indicates that the terminal has no preference between the RRC idle mode and the RRC inactive mode, and
  wherein the Connected indicates that the terminal indicates a second value indicating one of the Idle, the Inactive or the idleOrInactive, and then prefers to revert the indication of the second value.

* * * * *